United States Patent
Kidoh et al.

[11] Patent Number: 5,358,660
[45] Date of Patent: Oct. 25, 1994

[54] MAGNETIC PARTICLES FOR PERPENDICULAR MAGNETIC RECORDING

[75] Inventors: Takanori Kidoh; Katsura Ito; Kenzo Hanawa, all of Shiojiri, Japan

[73] Assignee: Showa Denko Kabushiki Kaisha, Tokyo, Japan

[21] Appl. No.: 915,294

[22] Filed: Jul. 20, 1992

Related U.S. Application Data

[63] Continuation of Ser. No. 830,454, Feb. 5, 1992, abandoned, which is a continuation of Ser. No. 766,914, Sep. 19, 1991, abandoned, which is a continuation of Ser. No. 297,288, Jan. 19, 1989, abandoned.

[30] Foreign Application Priority Data

Jan. 14, 1988 [JP] Japan .................. 63-6277

[51] Int. Cl.$^5$ .................. C04B 35/26
[52] U.S. Cl. .................. 252/62.63; 252/62.56; 252/62.58; 252/62.59; 252/62.62
[58] Field of Search .............. 252/62.56, 62.58, 62.59, 252/62.62, 62.63

[56] References Cited

U.S. PATENT DOCUMENTS

| 4,828,916 | 5/1989 | Yamamoto et al. | 252/62.62 |
| 4,851,292 | 7/1989 | Nagai et al. | 252/62.63 |
| 4,886,714 | 12/1989 | Torii et al. | 252/62.63 |

FOREIGN PATENT DOCUMENTS

| 56-60002 | 5/1981 | Japan . | |
| 56-67904 | 6/1981 | Japan . | |
| 56-118304 | 9/1981 | Japan . | |
| 56-118305 | 9/1981 | Japan . | |
| 56-125219 | 10/1981 | Japan . | |
| 56-149328 | 11/1981 | Japan . | |
| 56-155022 | 12/1981 | Japan . | |
| 59-106107 | 6/1984 | Japan . | 252/62.63 |
| 60-12973 | 1/1985 | Japan . | |
| 62-132732 | 6/1987 | Japan . | |
| 62-139123 | 6/1987 | Japan . | |
| 62-139124 | 6/1987 | Japan . | |
| 62-155504 | 7/1987 | Japan . | |

Primary Examiner—Jack Cooper
Attorney, Agent, or Firm—Sughrue, Mion, Zinn, Macpeak & Seas

[57] ABSTRACT

Magnetic particles for perpendicular magnetic recording, which are hexagonal ferrite particles having a hexagonal platelet shape, and are represented by the formula $MM'_xM''_yFe_{2x-y+2z}O_{1+4x+3z}$ (wherein M represents at least one element or a combination of elements selected from Ba, Sr, Ca and Pb; M' is at least one element or a combination of elements selected from Co, Zn and Mn; M'' is at least one element or a combination of elements selected from Co, Ti, In, Zn, Mn, Ge, Nb, Zr, Ta, V and Sn, x is a number of z/4 to z, inclusive; y is a number of 0 to (x+z)/3, inclusive; and z is a number of 5.5 to 9.0, inclusive), and has an average particle size of from 0.01 to 0.3 μm. The magnetic particles have a novel crystal structure different from both the magnetoplumbite structure and the spinel structure, even internally of the individual particles.

3 Claims, 3 Drawing Sheets

X 50000

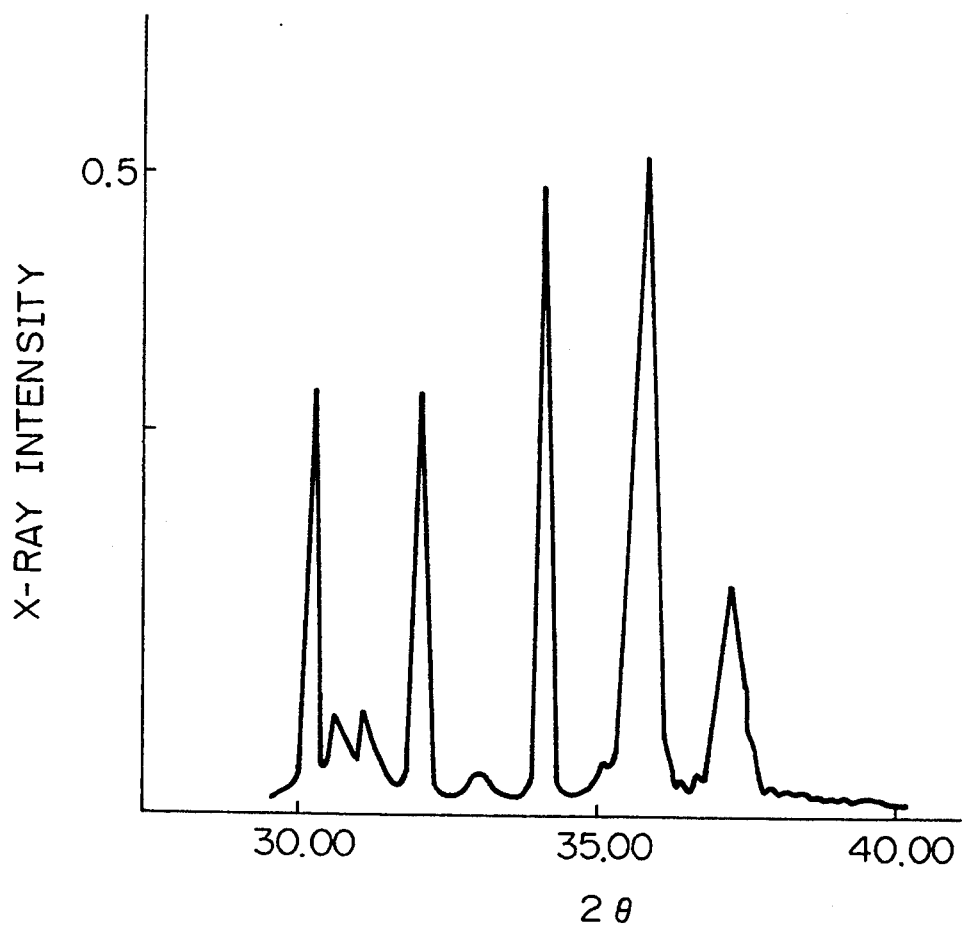

MAGNETIC PARTICLES FOR PERPENDICULAR MAGNETIC RECORDING

This is a continuation of application Ser. No. 07/830,454, filed Feb. 5, 1992 (now abandoned), which is a continuation of application Ser. No. 07/766,914, filed Sep. 27, 1991 (now abandoned), which is a continuation of application Ser. No. 07/297,288, filed Jan. 17, 1989 (now abandoned).

BACKGROUND OF THE INVENTION

1. Field of the Invention

The present invention relates to high density magnetic recording, particularly to magnetic particles useful as a coating type high density magnetic recording medium and a process for producing the same.

2. Description of the Related Art

In the field of magnetic recording, the advent of video and digital audio, etc., has led to a demand for high density recording. In longitudinal magnetic recording, which is currently most widely used, if a higher recording density is required, the demagnetizing field within the magnetic layer must be increased, and therefore, any improvement of the recording density is limited. Accordingly, to obtain high density recording, the industry is now carrying out intensive research into the process of perpendicular magnetic recording.

As methods of producing a magnetic layer having a readily magnetization easy axis in the perpendicular direction, there are known a method of forming a thin film of, for example, Co—Cr on a substrate by sputtering or evaporation and a method of coating a magnetic powder of, for example, barium ferrite, together with a binder. The coating method is widely used at present, and therefore, the coating type recording medium is more convenient for practical application.

The coating type perpendicular magnetic recording medium is obtained by using barium ferrite particles, particularly hexagonal platelet barium ferrite particles. In this case, the magnetic particles preferably have an average fine particle size at which they do not exhibit a superparamagnetic property, most preferably an average particle size of 0.01 to 0.3 $\mu$m, as described in, for example, Japanese Unexamined Patent Publication (Kokai) No. 56-125219, which states that the superiority of perpendicular magnetic recording over longitudinal magnetic recording becomes clear in the region where the recording wavelength is 1 $\mu$m or less, and in this wavelength region, to obtain a satisfactory recording and reproduction, the crystal particle size of the above ferrite is preferably 0.3 $\mu$m or less. If this crystal particle size is about 0.01 $\mu$m, a required strong magnetism is not exhibited, and therefore, the preferable crystal particle size is about 0.01 to 0.3 $\mu$m.

Next, as excellent a dispersibility as possible must be obtained, as described in, for example, Japanese Unexamined Patent Publication (Kokai) No. 56-155022, which states that, if a uniform dispersion is not obtained when formed into a coating material, a good recording medium cannot be obtained, and therefore, the individual particles must not be sintered and agglomerated at least during the preparation of a magnetic powder.

The saturation magnetization must be as large as possible, as described in, for example, Japanese Unexamined Patent Publication (Kokai) No. 56-149328, which states that, the magnetoplumbite ferrite to be used for the magnetic recording medium material must have as large a saturation magnetization as possible.

Further, the coercive force must be 300 to 1500 Oe, in association with the reproduction output and head properties, and the degree of dependence of coercive force on temperature must be as small as possible, as described in, for example, Japanese Unexamined Patent Publication (Kokai) No. 56-149328, which states that a magnetoplumbite ferrite exhibiting a coercive force value of 500 to 1500 Oe when formed into fine powder must be obtained. The coercive force must be large for a higher density and reproduction output, but a practical upper limit thereof is about 1500 Oe, due to the problem of head properties. Also, for example, Japanese Unexamined Patent Publication (Kokai) No. 62-132732 states that the coercive force of a magnetic recording medium greatly affects the electromagnetic converting characteristic, and fluctuation of the electromagnetic converting characteristic will cause a corresponding fluctuation of the recording, reproduction, and erasing characteristics. Namely, when a magnetic recording medium having a coercive force largely dependant on temperature is used at the places where the environmental temperatures are remarkably different, defective recording, lowering of reproduction output and a defective erasing of a recording will occur, whereby the function as a magnetic recording medium will be remarkably lowered.

As processes for the production of the hexagonal platelet barium ferrite particles for magnetic recording, the following three processes are known:

(1) The process of obtaining barium ferrite particles by mixing an alkali and an alkali carbonate into an aqueous solution containing a ferric salt and a barium salt, while stirring, to obtain a coprecipitate of ferric hydroxide and barium carbonate having a pH value of 10 or higher, thoroughly washing the coprecipitate with water and then drying, followed by a heat treatment at about 900° C. (refer to Japanese Unexamined Patent Publication (Kokai) No. 56-60002).

(2) The process of obtaining barium ferrite particles by heating an alkali solution having a pH value of 10 or higher and composed of dissolved or coprecipitated $Fe^{3+}$ and $Ba^{2+}$ to a temperature of 100° to 374° C. in an autoclave, to react and form a barium ferrite precursor (barium ferrite with an incomplete crystallinity and magnetic characteristic), followed by washing, drying and calcining (generally at 800° C. or higher) the reaction product (refer to, e.g., M. Kiyama, Bull. Chem. Soc. Jpa., 49 (1976) 1855; and Japanese Unexamined Patent Publication (Kokai) No. 60-12973).

(3) The process of mixing and melting the barium ferrite constituent starting materials such as BaO and $Fe_2O_3$ with a glass forming material such as $B_2O_3$, solidifying the molten mixture by quenching, then heat treating the solidified product to precipitate barium ferrite in the glass material, and dissolving the matrix to extract the barium ferrite particles, followed by washing with water and drying (refer to, e.g., Kenjo, Ido, Nikkei New Material, Apr. 28, 1986, page 52, and Japanese Unexamined Patent Publication (Kokai) No. 56-67904).

It is known in the art that barium ferrite particles for magnetic recording, satisfying the required average particle size and dispersibility conditions can be provided by the production processes described above.

Also, it is possible to obtain a required coercive force value by replacing a part of Fe in barium ferrite with another element, such as Co—Ti (e.g., refer to J. Smit H. P. J. Wijn Ferrites, 1959, page 208). Also, a method has been proposed of controlling a coercive force by making the magnetoplumbite type ferrite phase represented by $MO.nFe_2O_3$ and the spinel type ferrite phase represented by $M^+O.Fe_2O_3$ coexist (Japanese Unexamined Patent Publication (Kokai) No. 56-118304), and the method of controlling magnetic characteristics by modifying only the surfaces of the magnetoplumbite type ferrite particles with the spinel type ferrite (Japanese Unexamined Patent Publication (Kokai) No. 62-139123).

Nevertheless, in the method of controlling a coercive force by the replacement described above, a drawback arises in that lowering a saturation magnetization compared with the barium ferrite before replacement is incurred. Further, with respect to the thermal stability of a coercive force, coercive force of the barium ferrite before replacement is increased as the temperature is elevated, but after the replacement, the degree of dependence of the coercive force on temperature is further increased, and in some Examples shown in Japanese Unexamined Patent Publication (Kokai) No. 62-155504, reaches $0.61\%/°$ C. This deterioration in magnetic characteristics caused by the replacement makes magnetic recording very difficult, and is an obstacle to a practical application of the particles.

The particles, only the surfaces of which are treated as seen in Japanese Unexamined Patent Publication (Kokai) No. 62-139123 have a drawback in that the magnetic characteristics are changed with an elapse of time.

In view of these problems, the present invention provides a material for magnetic particles for perpendicular magnetic recording, which maintains a high value of saturation magnetization, especially a value of 60 emu/g or higher, with a coercive force controlled to an adequate value (300 to 1500 Oe), and at the same time has an excellent coercive force thermal stability, especially a degree of dependence of coercive force on temperature of $0.2\%/°$ C. or lower, without a change in the magnetic characteristics with an elapse of time.

SUMMARY OF THE INVENTION

The present inventors made an intensive study of the above problems, and consequently, found that a mere replacement of a part of Fe of the magnetoplumbite type ferrite single phase particles with other elements is not effective, but by changing individual particles of the magnetoplumbite type ferrite single phase particles to give them an entirely novel crystal structure characteristically different from both the magnetoplumbite structure and the spinel structure, internally of the particles, and in addition replacing a part of the Fe with other elements, magnetic particles having an enhanced saturation magnetization with a coercive force controlled to an adequate value, and an excellent coercive force thermal stability, without a change with an elapse of time, can be obtained.

More specifically, according to the present invention, by appropriately selecting M, M' and M" and the values of x, y and z individually in ferrite particles, having a novel crystal structure different from both the magnetoplumbite structure and the spinel structure, even internally of the particles, and expressed by the formula: $MM'_xM''_yFe_{2x-y+2z}O_{1+4x+3z}$ wherein M represents at least one element or a combination of elements selected from Ba, Sr, Ca and Pb; M' denotes at least one element or a combination of elements selected from Co, Zn and Mn; M" denotes at least one element or a combination of elements selected from Co, Ti, In, Zn, Mn, Ge, Nb, Zr, Ta, V and Sn; x is a number of z/4 to z (inclusive); y is a number of 0 to (x+z)/3 (inclusive); and z is a number of 5.5 to 9.0 (inclusive), a material can be provided which maintains a high saturation magnetization value, especially a value of 60 emu/g or higher, with a coercive force controlled to an adequate value (300 to 1500 Oe), and at the same time, has an excellent coercive force thermal stability, especially with a degree of dependence of the coercive force on temperature of $0.2\%/°$ C. or lower, without a change of the magnetic characteristics with an elapse of time.

In the production process, magnetic particles with a good dispersibility, and individually having a novel crystal structure different from both the magnetoplumbite structure and the spinel structure even internally of the particles, with a part of Fe replaced with other elements, can be provided at an extremely low cost by the coprecipitation method.

The most important specific features of the present invention are that hexagonal platelet ferrite particles individually having a novel crystal structure different from both the magnetoplumbite structure and the spinel structure, even internally of the particles, are constituted by adding elements corresponding to the magnetoplumbite type ferrite of the formula $MO.zFe_2O_3$ (M is at least one element or a combination of elements selected from Ba, Sr, Ca and Pb, and z is a number of 5.5 to 9.0 (inclusive)) and elements corresponding to the spinel type ferrite of the formula $M'O.Fe_2O_3$ (M' is at least one element or a combination of elements selected from Co, Zn and Mn), and further, in that a part of the Fe of the ferrite particles is replaced with M" (M" is at least one element or a combination of elements selected from Co, Ti, In, Zn, Mn, Ge, Nb, Zr, Ta, V and Sn).

As the prior art in which the magnetoplumbite type ferrite and the spinel type ferrite are permitted to coexist in some form, the magnetic powders disclosed in Japanese Unexamined Patent Publication (Kokai) Nos. 56-118304 and 56-118305 are an example, but these magnetic powders are intended for use in a magnetic card requiring a coercive force of 1000 Oe or higher, and thus have an entirely different technical task from that of the present invention. Further, because the magnetic powders are produced by a dry process using oxides as the starting materials, and via a crushing step, the hexagonal platelet shape is not obtained and further, the average particle size is as coarse as 0.6 to 0.7 $\mu$m. Thus, these particles are entirely different from the ferrite particles defined in the present invention.

As the prior art which provides an improved thermal stability of a coercive force of hexagonal platelet ferrite particles for magnetic recording, which is one of the principal objects of the present invention, platelet Ba ferrite fine particles are disclosed in Japanese Unexamined Patent Publication (Kokai) No. 62-139124. But these ferrite fine particles are intended to improve the magnetic characteristics by the method in which the particle surfaces of $BaO.n\{(Fe_{1-a}R_a)_2O_3\}$ (where $4 \leq n \leq 6$, $0 < a \leq 0.2$, R is Co (II), Ti (IV) or a divalent metal ion other than Co (II) obtained by the hydrothermal treatment process are modified with a Co ferrite $(Co^{2+}_xFe^{2+}_yO.Fe_2O_3$, $0 < x \leq 1$, $0 \leq y < 1$, $0 < x+y \leq 1)$; namely, by utilizing the magnetic powder of the magnetoplumbite type ferrite single phase and modifying only the particle surface thereof. In contrast, the magnetic particles of the present invention do not use a magnetic powder of the magnetoplumbite type ferrite single phase, and are individually particles having an entirely novel crystal structure different from both the magnetoplumbite structure and the spinel structure even internally of the particles, and thus have an entirely different technical concept. Further, in the technique shown in Japanese Unexamined Patent Publication (Kokai) No. 62-139124, although no description is given of a change of the magnetic characteristics with an elapse of time, the magnetic powder disclosed in the Example thereof contains divalent $Fe^{2+}$, and the final step is a warm water treatment at about 100° C. at highest, and thus is chemically very unstable and inevitably will suffer a deterioration of magnetic characteristics with an elapse of time. In contrast, the ferrite particles of the present invention do not contain divalent $Fe^{2+}$, and the final step is a heat treatment at 750° C. or higher, and therefore, these particles are chemically very stable and do no suffer from a change of the magnetic characteristics with an elapse of time.

As described above, the present invention, provides novel ferrite particles having excellent magnetic characteristics unobtainable by the prior art.

BRIEF DESCRIPTION OF THE DRAWINGS

FIG. 3 is an X-ray diffraction pattern of the powders obtained by mixing the magnetoplumbite type ferrite particles and the spinel type ferrite particles.

DESCRIPTION OF THE PREFERRED EMBODIMENTS

Figure 1:
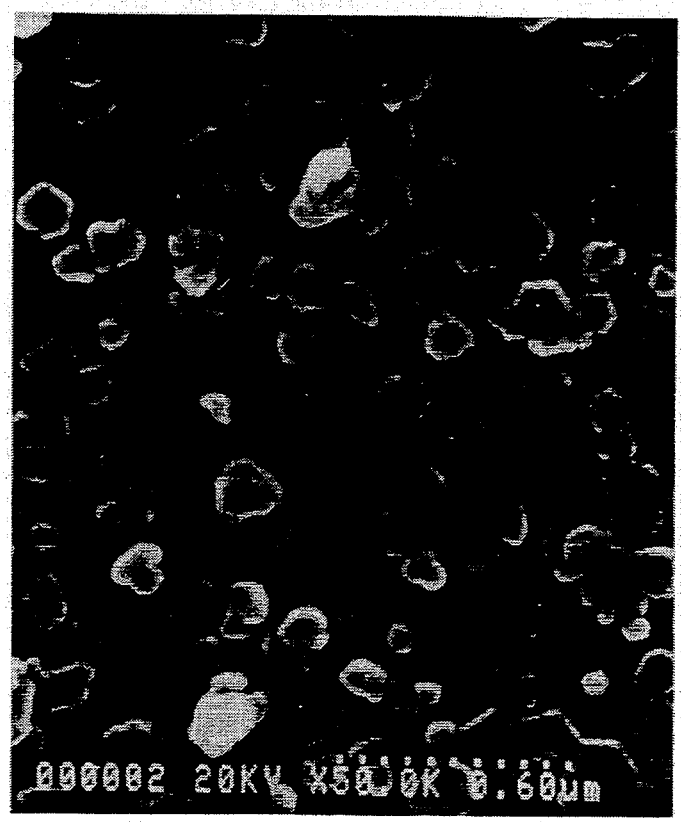
FIG. 1 is a scanning electron microscope photograph of the ferrite particles obtained in Example 1.

The present invention is described below in more detail with reference to the accompanying drawings.

The ferrite particles of the present invention have an individual novel crystal structure different from both the magnetoplumbite structure and the spinel structure, even internally of the particles, but when determining the chemical composition thereof, convenient by the element corresponding to the magnetoplumbite type ferrite and the element corresponding to the spinel type ferrite are considered separately.

First, M and z are the element and the value which constitute the magnetoplumbite type ferrite represented by the formula $MO \cdot zFe_2O_3$.

M may be a divalent ion having an ion radius approximate to that of an oxygen ion and constitutes the magnetoplumbite type ferrite, specifically Ba, Sr, Ca and Pb can be utilized; typically z=6 to prove a hexagonal magnetoplumbite type ferrite, but deviations are permissible within the solid solution region which can afford a high saturation magnetization, which is obtained within a z value of from 5.5 to 9.0.

On the other hand, M' may be any element constituting the spinel type ferrite represented by the formula $M'O \cdot Fe_2O_3$, but for the purpose of the present invention, is limited to elements or a combination of elements exhibiting a high saturation magnetization when the spinel type ferrite is constituted, as such elements, Co, Zn and Mn can be utilized. Zn effectively improves the saturation magnetization when formed into a solid solution, by coexisting with other elements such as Co.

With respect to the coexisting amount of Zn, the saturation magnetization becomes higher when (moles of Zn)/(total moles of Co, Mn and Zn) is 0.05 to 0.5 (inclusive).

Next, the coexisting ratio x of the element corresponding to the magnetoplumbite type ferrite and the element corresponding to the spinel type ferrite, must be within the range in which the formed particles exhibit a hexagonal platelet form. Although a specific value thereof cannot be absolutely determined, due to the influence of the kinds of M and M', the value of z, and the calcination conditions; wherein x is tentatively a number of z/4 to z (inclusive). The value of x is defined within this range because it is difficult to obtain a desired saturation magnetization value and thermal stability if x is a value less than z/4, and because giant particles not exhibiting a hexagonal platelet form are mixed into the ferrite particles if x exceeds z.

Ferrite particles having individually a novel crystal structure different from both the magnetoplumbite structure and the spinel structure, even internally of the particles, have a coercive force of about 1000 to 2000 Oe, and are partially applicable for magnetic recording.

Next, for further reducing and controlling the coercive force to at 300 to 1000 Oe, preferably a part of Fe of the ferrite particles is replaced with element M''. M'' is preferably an element having an ion radius approximately the same as that of Fe ion and easily replacing Fe in the ferrite particles. As such elements, Co, Ti, In, Zn, Mn, Ge, Nb, Zr, Ta, V and Sn, or combinations of such elements are available. Particularly, due to the replacement with trivalent Fe, the valency of the element need not be trivalent, but a combination of elements having a trivalent valence on an average, as a result of valence compensation such as in Co (II)—Ti (IV), is preferable. The amount of replacement by M'' must be in a range in which the readily magnetization easy direction of the ferrite particles is perpendicular to the platelet plane. The replacement amount by M'' is influenced by the kinds of M, M', and M'', the values of x and z, and the calcination conditions. The definition of the replacement amount is given below.

The formula of unreplaced ferrite particles having an individual novel crystal structure different from both the magnetoplumbite structure and the spinel structure, even internally of the particles as mentioned above, is represented by $[MO \cdot z(Fe_2O_3)] \cdot x(M'O \cdot Fe_2O_3)$, namely $MM'_xFe_{2x+2z}O_{1+4x+3z}$. When replacement of a part of Fe of the ferrite particles with element M'' is made, and if the amount is y, only y in (2x+2z) of Fe is substituted with element M''. Namely, yFe is replaced with yM'', and accordingly, the formula of the ferrite particles after replacement is represented by $MM'_xM''_yFe_{2x-y+2z}O_{1+4x+3z}$. Since the ferrite is useful for magnetic recording even without replacing Fe with the element M'', the lower limit of the replacement amount y is made 0. The upper limit of y is restricted to the limit at which the readily magnetization easy direction perpendicular to the plane of the hexagonal platelet ferrite particles is maintained. The readily magnetization easy direction is determined by the ratio of Fe and the replacement element. An increase of the replacement amount reduces the magnetic anisotropy in the perpendicular direction and the readily magnetization easy direction finally comes within the plane of the platelet. The limit of the ratio of Fe to M'' at which the readily magnetization easy direction is maintained perpendicular to the platelet plane is about 12:2. Accordingly, in the present invention, $(2x+2z):y=12:2$, namely $y=(x+z)/3$ is the upper limit.

The ferrite particles of the present invention can be provided by any of (1) the coprecipitation-calcination process, (2) the hydrothermal synthetic process, and (3) the glass crystallization process, as described above art, but since the existing ratio of M, M', M", and Fe, must be accurately defined, i.e., the values of x, y and z, preferably the ferrite particles are provided by the coprecipitation-calcination process, by which the formulation ratio of the starting materials is faithfully reproduced as the ratio existing in the ferrite particles formed.

Next, the process for producing the magnetic particles of the present invention is described in detail. The magnetic particles of the present invention can be produced by the coprecipitation method.

In the process for producing the magnetic particles of the present invention, water soluble salts of the above M, M' and M" (M represent at least one element or a combination of elements selected from Ba, Sr, Ca and Pb; M' is at least one element or a combination of elements selected from Co, Zn and Mn; M" is at least one element, or a combination of elements selected from Co, Ti, In, Zn, Mn, Ge, Nb, Zr, Ta, V and Sn) and Fe are used.

As water soluble salts of M, M', M" and Fe, chlorides or nitrates can be used. For example, $BaCl_2 \cdot 2H_2O$, $SrCl_2 \cdot 2H_2O$, $CaCl_2$, $PbCl_2$, $MnCl_2 \cdot 4H_2O$, $CoCl_2 \cdot 6H_2O$, $ZnCl_2$, $FeCl_3 \cdot 6H_2O$, etc. may be included. In view of treatment of the discharged gas during calcination, chlorides is preferably used.

These water soluble salts are dissolved in pure water to give a formulation ratio whereby the composition formula of the ferrite after calcination is $MM'_xM''_yFe_{2x-y+2z}O_{1+4x+3z}$ (wherein M represents at least one element or a combination of elements selected from Ba, Sr, Ca and Pb; M' is at least one element or a combination of elements selected from Co, Zn and Mn; M" is at least one element or a combination of elements selected from Co, Ti, In, Zn, Mn, Ge, Nb, Zr, Ta, V and Sn, x is a number of z/4 to z, y is a number of 0 to $(x+z)/3$, and z a number of 5.5 to 9.0). In the coprecipitation-calcination process, since the molar formation ratio of the water soluble salts is faithfully reproduced in the molar existing ratio of the metal ions in the ferrite formed, the molar ratio of the water soluble salts may be such that $M:M':M'':Fe = 1:x:y:(2x-y+2z)$. In this case to ensure that the ratio of $MO \cdot zFe_2O_3$ and $M'O \cdot Fe_2O_3$ becomes 1:x, the Fe salt is formulated in a greater amount for the spinel type bonding than when formulating the conventional magnetoplumbite type ferrite, and M" in an amount necessary to replace a part of Fe by y is formulated to form an aqueous solution.

Next, to the thus obtained aqueous solution containing equivalent amounts of M, M', M" and Fe are added alkali and alkali carbonates to obtain a coprecipitate. As the alkali, hydroxides of Na, K, $NH_3$ may be used, and as the alkali carbonate, carbonates of Na, K, $NH_3$ may be used. Carbonates are used for precipitating M, namely Ba, Sr, Ca and Pb, which is preferable in view of the treatment of the discharged gas during calcination. These alkali and alkali carbonates are dissolved in pure water to form an aqueous solution, and mixed while stirring, with the solution containing the water soluble salts previously prepared, to obtain a precipitate. Mixing is effected while vigorous by stirring and adding both aqueous solutions to pure water. Either of the aqueous solutions may be added first, or both may be added at the same time. The liquid temperature during stirring and mixing is preferably a room temperature to a temperature of warm water of about 75° C., and an amorphous coprecipitate of M, M', M" and Fe can be obtained by the above procedure.

The alkaline suspension of the coprecipitate thus obtained is neutralized to a pH value of from 7 to 10 by a dilute acid, preferably hydrochloric of acid. The pH value is defined as 7 to 10 because a part of the coprecipitate is dissolved when the pH value is smaller than 7, to cause fluctuations in the composition, and the remaining alkali interferes with the ferrite formation during calcination, causing a deterioration the magnetic characteristics, if the pH value is higher than 10.

After neutralization, the solid recovered by filtration is subjected to a heat treatment at 750° to 950° C., preferably 800° to 900° C., for about 0.5 to 10 hours, and the neutral salt composed mainly of NaCl formed during neutralization is permitted to coexist. If the heat treatment temperature is lower than 750° C., the ferrite formation reaction does not progress, and if higher than 950° C., fine particles are difficult to obtain. The neutral salts coexisting during the heat treatment prevent grain growth and agglomeration by existing between the individual ferrite particles formed.

By this heat treatment, fine ferrite particles exhibiting a hexagonal platelet form and individually having a novel crystal structure different from both the magnetoplumbite structure and the spinel structure, even internally of the particles, are formed.

The ferrite particles after the heat treatment are mixed with neutral salts composed mainly of NaCl, and therefore, are washed to remove the impure salts.

The function of the present invention is described below.

A principal object of the present invention is to supply ferrite particles for perpendicular magnetic recording having a coercive force controlled to an adequate value (300 to 1500 Oe), and a high saturation magnetization value, particularly a value of 60 emu/g or higher, and at the same time, having an excellent thermal stability of the coercive force, particularly a degree of dependence of coercive force of 0.2%/° C. or lower, without a change of the magnetic characteristics with an elapse of time. Also, when the function of the present invention is considered, preferably the element corresponding to the magnetoplumbite type ferrite and the element corresponding to the spinel type ferrite are considered separately. Note, obviously the crystal structure of the ferrite particles of the present invention is different from both the magnetoplumbite structure and the spinel structure.

First, maintenance of the saturation magnetization at 60 emu/g or higher is realized by permitting the element corresponding to the spinel ferrite containing the above M' to coexist in the ferrite particles. This increases the saturation magnetization as a whole by coexisting the spinel type ferrite having a higher saturation magnetization by addition of the former with the magnetoplumbite type ferrite, rather than to maintain the saturation magnetization of the unsubstituted magnetoplumbite ferrite. In this operation, the most important feature is that the ferrite particles exhibit a hexagonal platelet form, and such a state cannot be realized by merely mixing the separately formed magnetoplumbite ferrite particles and the spinel type ferrite particles. This is because the cubic particles inherent in the spinel type ferrite particles are mixed in the mixture, and such mixed particles do not have uniform magnetic characteristics, and are not preferable for high density magnetic recording. In the present invention, the definition of the particle shape as hexagonal platelet is only a definition of ferrite particles having a novel hexagonal type crystal structure different from both the magnetoplumbite structure and the spinel structure, in which novel structure individual particles, the element corresponding to the spinel type ferrite is added to barium ferrite, even internally of the particles.

Figure 2:
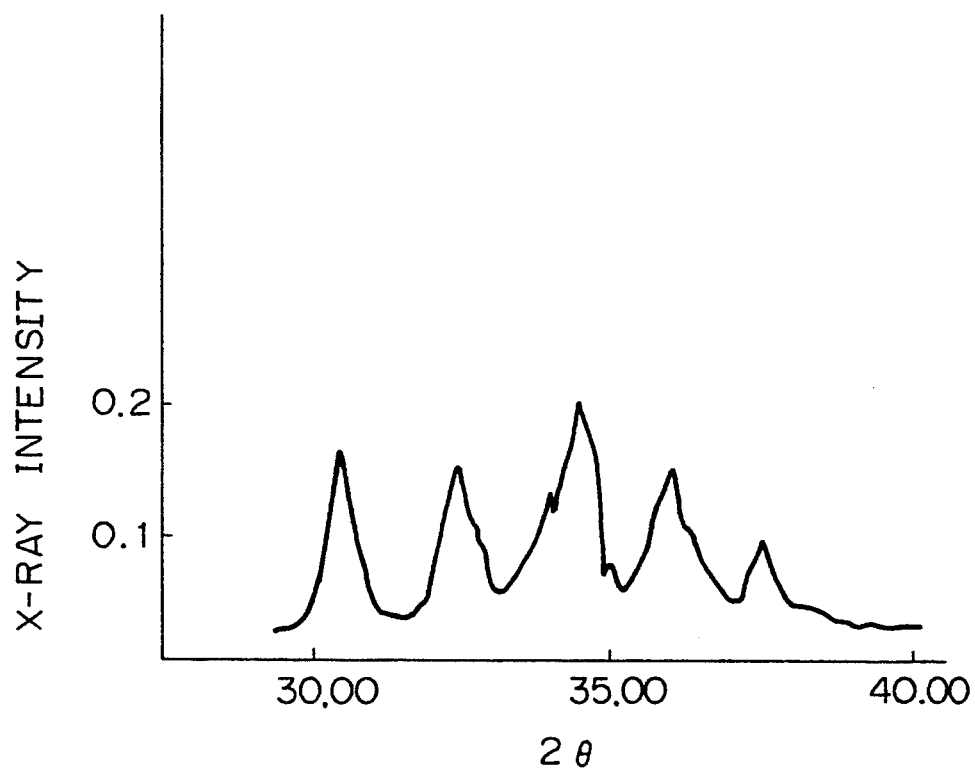
FIG. 2 is an X-ray diffraction pattern of the ferrite particles obtained in Example 1.

An X-ray diffraction pattern of the magnetic particles of the present invention by using of K$\alpha$-ray of Cu is as shown in FIG. 2. For comparison, an X-ray diffraction pattern of the powder obtained by mixing the magnetoplumbite type ferrite particles and the spinel type ferrite particles by using of K$\alpha$-ray of Cu is shown in FIG. 3.

As a specific feature of the X-ray diffraction peaks of the ferrite particles of the present invention, when compared with X-ray diffraction peaks of the mixture of the magnetoplumbite type ferrite particles and the spinel type ferrite particles, or compared with the magnetoplumbite type ferrite particles only the surfaces of which are modified with the spinel type ferrite, the value of $2\theta$ may be similar, but the diffraction intensity is far lower, and the peaks are broader in width. Peaks inherent to the ferrite particles of the present invention are also observed. This indicates that, in the ferrite particles of the present invention, individual particles have a novel crystal structure different from both the magnetoplumbite structure and the spinel structure, even internally of the particles, which distinguishes the ferrite particles of the present invention from the mixture of the magnetoplumbite type ferrite particles and the spinel type ferrite particles, and from the magnetoplumbite particles only the surfaces of which are modified with the spinel type ferrite, as described above.

Such ferrite particles can be supplied by the preparation processes described above, but preferably are supplied by the coprecipitation-calcination process.

The thus obtainable ferrite particles having a saturation magnetization of 60 emu/g or higher also have the preferable magnetic characteristics shown below.

The coercive force of the ferrite particles is about 1000 to 2000 Oe, and these particles are partially applicable for magnetic recording. Generally speaking, the magnetoplumbite ferrite has a large uniaxial anisotropy and a coercive force of 5000 Oe or higher, but in the ferrite particles, since individual particles have a novel crystal structure different from both the magnetoplumbite structure and the spinel structure, even internally of the particles, the uniaxial anisotropy is reduced.

The coercive force of the ferrite particles is very stable on temperature. Generally speaking, the coercive force of the magnetoplumbite ferrite is increased when the temperature is elevated, but in the ferrite particles, since individual particles have a novel structure different from both the magnetoplumbite structure and the spinel structure, even internally of the particles, the degree of dependence of the coercive force on temperature is reduced, and sometimes a negative dependence of coercive force on temperature may be exhibited in the case of a large coexisting ratio of the element corresponding to the spinel type ferrite.

The ferrite particles in which individual particles have a novel crystal structure different from both the magnetoplumbite structure and the spinel structure, even internally of the particles, are partially applicable as such for magnetic recording, but to provide a more preferable material for magnetic recording, the replacement of a part of Fe constituting the ferrite particles with M" (M" represents at least one element, or a mixture of elements selected from Co, T, In, Zn, Mn, Ge, Nb, Zr, Ta, V and Sn) to reduce the coercive force is practiced. In this replacement, by appropriately selecting the kind and the replacement amount of M", the coercive force of the particles can be controlled to any desired value within a preferable range for magnetic recording. Due to the replacement, the saturation magnetization of the ferrite particles is slightly lowered, and the degree of dependence of coercive force on temperature is made more positive. Accordingly, to obtain ferrite particles having the desired magnetic characteristics, namely ferrite particles having a high saturation magnetization value, especially a value of 60 emu/g or higher, while controlling the coercive force thereof to an adequate value (300 to 1500 Oe), and at the same time, having an excellent coercive force thermal stability, especially a degree of dependence of a coercive force on temperature of 0.2%/° C. or lower, the formulation must begin with the correct starting materials.

The present invention is described below with reference to Examples.

Example 1

An aqueous solution of 0.0105 mol of $BaCl_2 \cdot 2H_2O$, 0.028665 mol of $COCl_2 \cdot 6H_2O$, 0.00819 mol of $TiCl_4$ and 0.14742 mol of $FeCl_3 \cdot 6H_2O$ in 300 ml of distilled water and an alkaline aqueous solution of 0.7125 mol of NaOH and 0.0105 mol of $Na_2CO_3$ in distilled water were added at the same time under vigorous stirring into distilled water at 50° C. to form a slurry of a co-precipitate comprising $BaCO_3$, $Co(OH)_2$, $Ti(OH)_4$ and $Fe(OH)_3$. The slurry was aged for 30 hours, neutralized to a pH value of 8.5 with a 5% aqueous HCl solution, filtered, and cake dried to obtain fine powders of an amorphous co-precipitate. The powders were subjected to heat treatment in air at 850° C. for 2 hours, and then washed with distilled water to remove residual impurity salts, followed by drying to obtain hexagonal platelet ferrite fine powders represented by the compositional formula $BaCo_2(Co_{\frac{1}{2}}-Ti_{\frac{1}{2}})_{1.6}Fe_{14.4}O_{27}$.

FIG. 1 is a scanning electron microscope photograph of the obtained powders. As can be seen from the Figure, the powder consists of hexagonal platelet ferrite particles with a sharp particle size distribution and an average particle size of 0.10 $\mu$m.

The magnetic characteristics of the ferrite powders were measured by VSM (measurement magnetic field 10 kOe) and a saturation magnetization of 64.5 emu/g, a coercive force of 630 Oe, and a degree of dependence of coercive force on temperature at 20°–120° C. of 0.05%/° C. were obtained, and did not change with an elapse of time.

FIG. 2 shows an X-ray diffraction chart of the ferrite powders. As can be seen from the figure, although the $2\theta$ values are similar to those of an X-ray diffraction chart of the powders obtained by mixing the magnetoplumbite type ferrite and the spinel type ferrite (FIG. 3), the diffraction intensities are by far lower and broader peaks are formed. This diffraction pattern is inherent to the ferrite particles of the present invention, and because such a diffraction pattern exhibited, it is clear that the ferrite particles form a crystal structure different from both the magnetoplumbite structure and the spinel structure, even internally of the individual particles.

Example 2

The same procedure as in Example 1 was carried out, except that the solution containing metal chlorides was replaced by a solution of 0.00833 mol of $BaCl_2 \cdot 2H_2O$, 0.0229 mol of $CoCl_2 \cdot 6H_2O$, 0.00980 mol of $ZnCl_2$, 0.00350 mol of $TiCl_4$ and 0.1680 mol of $FeCl_3 \cdot 6H_2O$ in 300 ml of distilled water, and the heat treatment temperature was 800° C. and hexagonal platelet ferrite powders represented by the compositional formula $Ba(Co_{0.7}-Zn_{0.3})_{3.5}(Co_{0.35}-Zn_{0.15}-Ti_{0.5})_{0.84}Fe_{20.16}O_{36}$ were obtained.

The magnetic characteristics of the ferrite powders were measured by VSM (measurement magnetic field 10 kOe), and a saturation magnetization of 70.0 emu/g, a coercive force of 700 Oe and a degree of dependence of coercive force on temperature at 20°-120° C. of −0.06%/° C. were obtained, and did not change with an elapse of time.

The average particle size was 0.07 μm and under X-ray diffraction, exhibited a diffraction pattern inherent to ferrite particles of the present invention, as in Example 1.

Comparative Example 1

The same procedure as in Example 1 was carried out except that the solution containing metal chlorides was replaced by a solution of 0.0105 mol of $BaCl_2 \cdot 2H_2O$, 0.00819 mol of $CoCl_2 \cdot 6H_2O$, 0.00819 mol of $TiCl_4$ and 0.1065 mol of $FeCl_3 \cdot 6H_2O$ in 300 ml of distilled water, and hexagonal platelet ferrite powders represented by the compositional formula $Ba(Co_{\frac{1}{2}}-Ti_{\frac{1}{2}})_{1.6}Fe_{10.4}O_{10}$ were obtained.

The magnetic characteristics of the ferrite powders were measured by VSM (measurement magnetic field 10 kOe), and a saturation magnetization of 59.5 emu/g, a coercive force of 870 Oe and a degree of dependence of coercive force on temperature at 20°-120° C. of 0.45%/° C. were obtained. The magnetic characteristics did not change with an elapse of time. The results of an X-ray diffraction showed that the ferrite powders exhibited only the peaks of the magnetoplumbite type ferrite.

The hexagonal platelet ferrite particles of the present invention, as shown in the above Examples, have an average particle size of 0.01 to 0.3 μm and a sharp particle size distribution, exhibit excellent magnetic characteristics of a saturation magnetization of 60 emu/g or higher, a coercive force of 300 to 1500 Oe at room temperature, and a degree of dependence of coercive force on temperature at 20°-120° C. of 0.2%/° C. or lower without a change thereof with an elapse of time, and therefore, are most suitable for magnetic recording.

We claim:

1. Magnetic particles for perpendicular magnetic recording, wherein said magnetic particles are hexagonal ferrite particles having a hexagonal platelet shape, have a crystal structure different from both a magnetoplumbite structure and a spinel structure, have an x-ray diffraction pattern in accordance with FIG. 2, and are represented by the formula:

$$MM'_xM''_yFe_{2x-y+2z}O_{1+4+3z}$$

wherein M represents at least one element or a combination of elements selected from Ba, Sr, Ca and Pb;

M' is at least one element or a combination of elements selected from Co, Zn and Mn;

M" is at least one element or a combination of elements selected from Co, Ti, In, Zn, Mn, Ge, Nb, Zr, Ta, V and Sn, M" having an average valency of 3;

All Fe's are trivalent and no divalent Fe is present;

x is a number of z/4 to z, inclusive;

y is a number of from more than 0 to (x+z)/3, inclusive; and z is a number of 5.5 to 9.0, inclusive.

wherein said magnetic particles have an average particle size of from 0.01 to 0.3 μm, a saturation magnetization at room temperature of 60 emu/g or higher, a coercive force of 300 to 1500 Oe and a degree of dependence of coercive force on temperature of 0.2%/° C. or lower based on the temperature range of 20° to 120° C.

2. Magnetic particles according to claim 1, having a saturation magnetization at room temperature of 65 emu/g or higher, a coercive force of 500 to 1000 Oe and a temperature change rate of coercive force of 0.2%/° C. or lower based on the temperature range of 20° to 120° C.

3. The magnetic particles as claimed in claim 1, wherein y is from 0.84 to (x+z)/3, inclusive.

* * * * *